United States Patent Office 2,754,494
Patented July 10, 1956

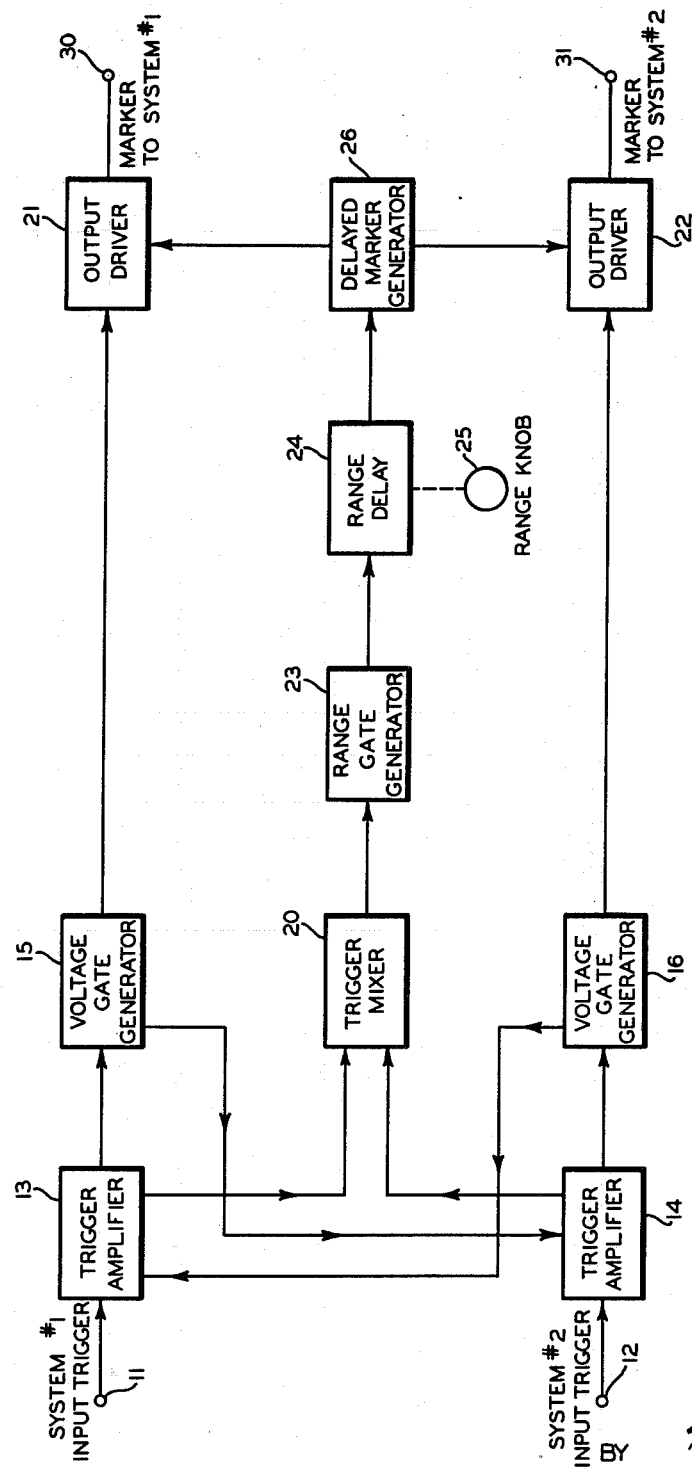

2,754,494

RANGE MARKER SYSTEM

Paul F. Brown, Bloomfield, N. J., assignor, by mesne assignments, to the United States of America as represented by the Secretary of the Navy Application May 1, 1946, Serial No. 666,221

12 Claims. (Cl. 340—147)

This invention relates to electronic apparatus for generating a range mark on radar systems and more particularly to apparatus generating a common range marker for use with independently triggered radar systems.

In multiple radar installations, it is often necessary that the attention of the operators of all the individual radar sets be focussed on a single target. When there are more than one target present, and also when the presentations on the separate radar indicators are different, this problem becomes increasingly difficult. A convenient method of designating the specific target to be considered is to have a range marker, common to all presentations, that may be varied in range by one of the radar operators. The range marker is made to vary in range until it corresponds with the range of the target under consideration. In order for this range marker to be at the same range on all radar presentations there must be some method for synchronization between it and the sweeps of the individual radar sets.

In systems where the transmitted pulse of all the individual radar sets are synchronized, it is only necessary to introduce a common electrical marker pulse which is movable in range, as the range sweeps of all radar sets start at the same time. However, when the radar transmitters are independently pulsed a method must be provided of getting synchronism between each of the radars' sweeps and the common range marker so that the latter will not jitter or drift along the radar presentations.

In this embodiment of the invention a system is presented in which a common range marker generator and delay circuit is used. When this common range circuit is triggered by any one of the radar sets, the delayed range marker is formed and introduced into the radar presentation of the set originally initiating the action. The selection of the proper radar channel for the marker output by the initiating trigger has the advantage over other circuits, such as a flip-flop, or coincidence circuit, in that the marker output appears more often on the individual radar presentation resulting in a brighter mark.

Another advantage of the use of a common delay system over separate systems is that it eliminates the requirement of constant calibration checks to maintain the delay equal on all presentations.

A primary object of this invention is to provide a common variable range marker for presentation on all radar indicators in multiple radar installations.

Another object of this invention is to provide a common variable range marker on all radar indicators in a multiple radar installation when all radar transmitters are pulsed independently.

These and other objects will be apparent to those skilled in the art from the following description when taken with the accompanying drawing which is a schematic block diagram of one embodiment thereof.

Referring to the diagram, an electronic circuit is shown that receives into individual channels input trigger voltages from each radar transmitter in a multiple radar installation. Each channel comprises in the input a trigger amplifier and a voltage gate generator, and in the output an output driver. In addition to the above mentioned individual channels, there is a common delay and pulse generating channel having its output fed to the output drivers of each of the individual channels. When a radar transmitter voltge trigger is introduced into one of the individual channels, the voltage gate generator in this channel produces a negative voltage gate that is used to prevent the entry of other radar transmitter voltage triggers to their respective channels. The voltage gate generator simultaneously generates a positive voltage gate that enables only the output driver of this particular channel to pass the output of the common delay and pulse generating channel to the proper marker output terminal during the range sweep time of the radar set initiating the action.

In this embodiment of the invention a radar transmitter voltage trigger may be introduced at either terminals 11 or 12. Assuming that this trigger is applied to terminal 11, it is passed into trigger amplifier 13. Trigger amplifier 13 consists of a triode amplifier and a biased blocking oscillator and serves to isolate the trigger source from the marker generator system and to amplify and sharpen the trigger. The trigger voltage output from trigger amplifier 13 is connected to voltage gate generator 15 and to trigger mixer 20. Voltage gate generator 15 is a biased multivibrator of the so-called "one shot" type having a positive voltage gate output that is connected to output driver 21 and a negative gate output coupled to trigger amplifier 14. The term voltage gate as used here and hereinafter refers to a square wave voltage pulse either positive or negative and used to enable or block following circuits.

This negative voltage gate is used to bias trigger amplifier 14 below cutoff so that triggers arriving at terminal 12 will not be passed into the system during the gate length of voltage gate generator 15. The gate length of voltage gate generator 15 is set to cover the duration of the range sweeps of the radar sets in use. Trigger mixer 20 receives its input from trigger amplifiers 13 and 14 and is used to isolate them from each other and from range gate generator 23. The voltage trigger from trigger mixer 20 is passed to range gate generator 23 which is a biased one-shot multivibrator producing a positive voltage gate output of duration equal to the range delay desired for the movable marker plus twenty percent to enable range delay circuit 24 to recover. The positive gate output is used to fire range delay circuit 24 and also serves to prevent closely spaced triggers from getting through to range delay circuit 24 should voltage gate generators 15 and 16 fail to separate input triggers that are nearly coincident at terminal 11 and 12. Range delay circuit 24 is a phantastron type circuit having a negative voltage pulse output. The time duration of the pulse may be varied by a range potentiometer that is mechanically adjusted by range knob 25. The output from range delay circuit 24 is coupled to delayed marker generator 26 which consists of a triode control tube and a biased blocking oscillator. The voltage rise at the trailing edge of the output of range delay circuit 24 causes delayed marker generator 26 to produce a marker pulse output. As the leading edge of the output from range delay circuit 24 occurs at the time of the transmitter voltage trigger and the marker pulse output of marker pulse generator 26 occurs at the trailing edge of the output of range delay circuit 24, the delay time between the two can be varied by changing the time duration of the output pulse of range delay circuit 24 which is changed by range knob 25.

The pulse output from delayed marker generator 26 is connected to output drivers 21 and 22, which are cathode followers normally biased below cut-off. However, output driver 21 has received a positive voltage gate from voltage gate generator 15 which permits the marker pulse to be coupled to output terminal 30. As output driver 22 has received no enabling gate, the marker pulse does not appear at terminal 31. The operation has been described with respect to an input trigger to terminal 11. If the input trigger voltage appears at terminal 12 the action of the common circuit elements, trigger mixer 20, range gate generator 23, range delay circuit 24, and delayed marker generator 26, will be the same as the above. The action previously accomplished by trigger amplifier 13, voltage gate generator 15, and output driver 21 will be accomplished by trigger amplifier 14, voltage gate generator 16, and output driver 22 which are similarly connected except that the input is taken from terminal 12 and the output is coupled to terminal 31.

The invention described in the foregoing specification need not be limited to the details shown, which are considered to be illustrative of one form the invention may take. The scope of the invention is defined by the appended claims.

What is claimed is:

1. An electronic circuit for generating a common range marker for independently triggered radio pulse echo detection systems in a multiple system installation comprising, a range marker pulse generator, means to operate said marker generator by a signal from any one of said independently triggered systems, a phantastron circuit to insert a variable delay between said radar transmitter signal and said range marker pulse, a biased one shot multivibrator providing a range delay gate to prevent said phantastron from being triggered before it has completely recovered from its operating cycle, means to prevent other system transmitter triggers of said multiple system installations triggering said marker generator during the range sweep time of the system operating said marker generator, and means to apply the output of said marker generator solely to the indicator of said system initiating the marker pulse.

2. An electronic circuit for generating a common range marker for independently triggered radio pulse echo detection systems in a multiple system installation comprising, a range marker pulse generator, an input channel for said marker generator from each of said system transmitters including a trigger amplifier, blocking oscillator, and a biased one shot multivibrator voltage gate generator, said voltage gate generator adapted to produce a negative voltage gate to cut off said trigger amplifier in all other input channels during the length of said negative voltage gate, said voltage gate having a duration equal to the range sweep time of the system initiating the action, a trigger mixer circuit to isolate said trigger amplifiers from each other, a range gate voltage generator, a range delay circuit controlled by said range gate generator, said range marker pulse generator being coupled to said range delay circuit and adapted to be operated by the delayed output of said range delay circuit, said range gate generator preventing triggering of said range delay circuit before it has fully recovered from the previous cycle of operation, and means to apply the output from said range marker pulse generator solely to indicator of the system triggering said range marker pulse generator from its quiescent condition.

3. An electronic circuit for generating a common range marker for independently triggered radio pulse echo detection systems in a multiple system installation comprising an individual channel for each system including an input terminal, a trigger amplifier, a first biased blocking oscillator, a first biased one shot multivibrator voltage gate generator, and an output driver said voltage gate generator producing, when triggered, negative voltage gates to cut-off said trigger amplifier in said channels of all other systems preventing the entry of other system transmitting triggers during the range sweep time of the initiating system, said output driver being normally cut-off, said voltage gate generator producing, when triggered, a positive voltage gate enabling signals arriving at said respective output driver to pass to its respective output terminal, and a common marker generating channel including a trigger mixer to isolate trigger amplifiers from each other, a second "one shot" biased multivibrator, a phantastron delay circuit and a second biased blocking oscillator, said second blocking oscillator being triggered by the delayed trailing edge of the output from said phantastron, said second "one shot" multivibrator being coupled to said phantastron circuit and adapted to operate said phantastron circuit from the output of said trigger mixer, and the output of said second blocking oscillator constituting the delayed marker pulse fed to said output drivers in each of said channels.

4. An electronic circuit for generating a common range marker for independently triggered radio pulse echo detection systems in multiple system installations comprising, a range marker pulse generator, means for operating said marker generator by a signal from any one of said independently triggered radio pulse echo detection systems, a delay circuit for inserting a variable delay between said signal from said radio pulse echo system and a signal from said range marker pulse generator, means operative to prevent other radio pulse echo detection systems from triggering said marker generator during the range sweep time of the system operating said marker generator and means for applying the output of said marker generator solely to the indicator of the system initiating the marker pulse.

5. An electronic circuit for generating a common range marker for independently triggered radio pulse echo detection systems in multiple system installations comprising a plurality of input circuits each responsive to a signal from a different one of said systems in said multiple system installations, a corresponding plurality of output circuits each adapted to return a signal to a different one of said systems in said multiple system installation, a range marker generator, means for selectively operating said range marker generator by a signal from any one of said input circuits, means coupling the output of said marker generator to each of said output circuits and means for rendering all of said output circuits inoperative to return a signal except the output circuit associated with the system supplying a signal to said selected input circuit.

6. An electronic circuit for generating a common range marker for independently triggered radio pulse echo detection systems in a multiple system installation comprising a plurality of input circuits each responsive to a signal from a different one of said systems in said multiple system installation, a corresponding plurality of output circuits each adapted to return a signal to a different one of said systems in said multiple system installation, a range marker generator, means for selectively operating said range marker generator by a signal from any one of said input circuits, means for varying the time interval between said operating input signal and an output signal from said marker generator, means coupling the output of said marker generator to each of said output circuits and means for rendering all of said output circuits inoperative to return a signal except the output circuit associated with the system supplying a signal to said selected input circuit.

7. An electronic circuit for generating a common range marker for independently triggered radio pulse echo detection systems in a multiple system installation comprising a plurality of input circuits each responsive to a signal from a different one of said systems in said multiple system installation, a corresponding plurality of output circuits each adapted to return a signal to a different one of said systems in said multiple system installation, a range marker generator, means coupling the output of each of said input circuits to said marker generator thereby to cause said marker generator to operate in response to a signal from any one of said input circuits, means for rendering all of said input circuits except one incapable of supplying a signal to said marker generator upon receipt of a signal by said one input circuit, means coupling the output of said marker generator to each of said output circuits, and means for rendering all of said output circuits inoperative to return a signal except the output circuit associated with the system supplying a signal to said input circuit operating said marker generator.

8. An electronic circuit as in claim 7 wherein said input circuits are rendered incapable of supplying a signal to said marker generator for an interval following the receipt of a signal by one of said input circuits equal to the duration of the range sweeps of the systems in said installation and wherein said circuit further comprises means for varying the time interval between an input signal at said input circuits and an output signal from said marker generator.

9. An electronic circuit for generating a common range marker for independently triggered radio pulse echo detection systems in multiple system installations comprising a plurality of input circuits each responsive to a signal from a different one of said systems in said multiple system installation, a corresponding plurality of gate generator circuits, each of said gate generator circuits having an input signal coupled thereto from a different one of said input circuits, a range marker generator having its input coupled to the output of each of said input circuits, each of said gate generators upon receipt of an input signal from its associated input circuit supplying a signal to each of the other said input circuits to render said circuits incapable of supplying a signal to said range marker generator and to its associated gate generator, a plurality of output circuits corresponding in number to the number of said input circuits, each of said output circuits being adapted to return a signal to a different one of said systems upon the application of a signal to said output circuit, means coupling the output of said marker generator to each of said output circuits and means for rendering all of said output circuits inoperative to return a signal except the output circuit associated with the system supplying a signal to said selected input circuit.

10. An electronic circuit for generating a common range marker for first and second independently triggered radio pulse echo detection systems in a multiple system installation comprising, first and second input circuits adapted to receive a triggering signal from said first and second systems respectively, a range marker generator, means coupling a first output of each of said two input circuits to said range marker generator, said range marker generator being adapted to produce an output signal a predetermined interval of time after an input signal is applied thereto, first and second output circuits, means coupling the output of said range marker generator to each of said two output circuits, said first and second output circuits being adapted to return a signal to said first and second systems respectively upon the simultaneous application thereto of a signal from said range marker generator and an enabling signal, first and second gate generators, means coupling a second output from said first and second input circuits respectively to said first and second gate generators, said first gate generator being adapted upon the receipt of a signal from said first input circuit to supply an enabling signal to said first output circuit and simultaneously to supply a blocking signal to said second input circuit to block said first and second output signals from said second input circuit for the duration of said blocking signal, said second gate generator being adapted upon receipt of a signal from said second input circuit to supply an enabling signal to said second output circuit and simultaneously to supply a blocking signal to said second input circuit to block said first and second output signals from said first input circuits.

11. An electronic circuit as in claim 10 wherein said enabling signals and said blocking signals have a duration equal to the duration of the range sweeps of said first and second systems and wherein said range marker generator includes a signal mixer having first and second inputs coupled to said first outputs of said first and second input circuits respectively, adjustable delay means coupled to said mixer and providing a signal a preselected time after a signal is applied thereto from said mixer and means responsive to said signal from said delay means for generating an output signal, said output signal being said signal coupled to said first and second output circuits from said range marker generator.

12. An electronic circuit as in claim 10 wherein said enabling signals and said blocking signals have a duration equal to the duration of the range sweeps of said first and second systems and wherein said range marker generator includes a signal mixer having first and second inputs coupled to said first outputs of said first and second input circuits respectively, adjustable delay means coupled to said mixer and providing a signal a preselected time after a signal is applied thereto from said mixer, additional means coupled to said mixer and adapted to block additional signals from said mixer for a time interval greater than the maximum delay of said delay means, and means responsive to said signal from said delay means for generating an output signal, said output signal being said signal coupled to said first and second output circuits from said range marker generator.

References Cited in the file of this patent

UNITED STATES PATENTS

| | | |
|---|---|---|
| 2,419,205 | Feldman | Apr. 22, 1947 |
| 2,426,182 | De Lange | Aug. 26, 1947 |
| 2,516,356 | Tull et al. | July 25, 1950 |